United States Patent
Hamrin et al.

(10) Patent No.: US 11,828,354 B2
(45) Date of Patent: Nov. 28, 2023

(54) OVERRUNNING CLUTCH DIFFERENTIAL WITH A LOCKING MECHANISM

(71) Applicant: TEAM Industries, Inc., Bagley, MN (US)

(72) Inventors: John Edward Hamrin, Bemidji, MN (US); Jordan Murphy, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 17/749,986

(22) Filed: May 20, 2022

(65) Prior Publication Data

US 2022/0381329 A1 Dec. 1, 2022

Related U.S. Application Data

(60) Provisional application No. 63/194,777, filed on May 28, 2021.

(51) Int. Cl.
*F16H 48/16* (2006.01)
*F16H 48/06* (2006.01)
*F16H 48/20* (2012.01)

(52) U.S. Cl.
CPC ....... *F16H 48/06* (2013.01); *F16H 2048/202* (2013.01)

(58) Field of Classification Search
CPC .... F16H 48/16; F16H 2048/202; F16H 48/11; F16H 48/34
See application file for complete search history.

(56) References Cited

U.S. PATENT DOCUMENTS

| | | | |
|---|---|---|---|
| 1,823,389 | A | 9/1931 | De |
| 1,902,449 | A | 3/1933 | Hughes |
| 3,055,471 | A | 9/1962 | Warn et al. |
| 3,283,611 | A | 11/1966 | Weismann et al. |
| 3,300,002 | A | 1/1967 | Roper |
| 3,344,686 | A | 10/1967 | Baker |
| 3,447,396 | A | 6/1969 | Seliger |
| 3,700,082 | A | 10/1972 | Schwab |
| 3,788,435 | A | 1/1974 | Prueter |
| 4,044,870 | A | 8/1977 | Fogelberg |
| 4,124,085 | A | 11/1978 | Fogelberg |

(Continued)

FOREIGN PATENT DOCUMENTS

| | | |
|---|---|---|
| CA | 2904602 C | 2/2018 |
| DE | 430321 C | 6/1926 |

(Continued)

OTHER PUBLICATIONS

"Auto Locking Front Drive System (Differential) For On-Demand Four Wheel Drive", at least as early as Feb. 9, 2019, p. 1.

(Continued)

*Primary Examiner* — Victor L MacArthur
(74) *Attorney, Agent, or Firm* — Fogg & Powers LLC

(57) ABSTRACT

An overrunning clutch (ORC) differential is provided that includes a locking mechanism that is configured to lock rotation of a clutch cam housing to a roller cage to retain a centering of each roller in an associated cam roller feature to prevent torque from being communicated between the clutch cam housing and first and second hubs when the locking mechanism is activated.

20 Claims, 13 Drawing Sheets

(56) References Cited

U.S. PATENT DOCUMENTS

| | | |
|---|---|---|
| 5,025,902 A | 6/1991 | Imai et al. |
| 5,036,939 A | 8/1991 | Johnson et al. |
| 5,971,123 A | 10/1999 | Ochab et al. |
| 6,132,332 A | 10/2000 | Yasui |
| RE38,012 E | 3/2003 | Ochab et al. |
| 6,557,677 B2 | 5/2003 | Peura |
| 6,595,337 B2 | 7/2003 | Goto et al. |
| 6,629,590 B2 | 10/2003 | Ochab et al. |
| 6,722,484 B2 | 4/2004 | Ochab et al. |
| 7,410,042 B2 | 8/2008 | Ochab et al. |
| 7,490,708 B2 | 2/2009 | Yikura et al. |
| 7,493,998 B2 | 2/2009 | Trikura et al. |
| 7,559,390 B2 | 7/2009 | Marsh et al. |
| 7,690,469 B2 | 4/2010 | Trikura et al. |
| 7,938,041 B1 | 5/2011 | Shiigi et al. |
| 8,312,792 B1 | 11/2012 | Kochidomari et al. |
| 8,365,636 B2 | 2/2013 | Irikura et al. |
| 8,840,514 B1 | 9/2014 | Knickerbocker et al. |
| 8,857,294 B2 | 10/2014 | Brewer et al. |
| 9,022,195 B2 | 5/2015 | Heath et al. |
| 9,033,851 B2 | 5/2015 | Itakura et al. |
| 9,272,620 B2 | 3/2016 | Knickerbocker et al. |
| 9,719,567 B2 | 8/2017 | Lawrence et al. |
| 9,856,930 B2 | 1/2018 | Heath et al. |
| 10,150,369 B2 | 12/2018 | Thornton et al. |
| 10,337,570 B2 | 7/2019 | Tsukamoto et al. |
| 10,989,258 B1 * | 4/2021 | Coon .................... F16D 27/108 |
| 11,047,464 B2 | 6/2021 | Hamrin et al. |
| 2002/0125095 A1 | 9/2002 | Ochab et al. |
| 2002/0125097 A1 | 9/2002 | Ochab et al. |
| 2003/0000796 A1 | 1/2003 | Kawai et al. |
| 2006/0254382 A1 | 11/2006 | Ebihara |
| 2007/0170029 A1 | 7/2007 | Okada et al. |
| 2007/0286743 A1 | 12/2007 | Ochab et al. |
| 2013/0112520 A1 | 5/2013 | Heath et al. |
| 2013/0134006 A1 | 5/2013 | Heath et al. |
| 2013/0199886 A1 | 8/2013 | Heath et al. |
| 2014/0038763 A1 | 2/2014 | Knickerbocker et al. |
| 2014/0274530 A1 | 9/2014 | Knickerbocker et al. |
| 2015/0159743 A1 | 6/2015 | Palmer et al. |
| 2017/0108059 A1 | 4/2017 | Tsukamoto et al. |
| 2017/0210226 A1 | 7/2017 | Thornton et al. |
| 2017/0268584 A1 | 9/2017 | Heath et al. |
| 2018/0283472 A1 | 10/2018 | Fukuda |
| 2020/0263775 A1 | 8/2020 | Murphy et al. |

FOREIGN PATENT DOCUMENTS

| | | |
|---|---|---|
| EP | 1707837 A1 | 10/2006 |
| EP | 1350657 B1 | 2/2007 |
| EP | 2971830 B1 | 7/2018 |
| GB | 2252801 A | 8/1992 |
| JP | S5986748 A | 5/1984 |
| WO | 2002040891 A2 | 5/2002 |
| WO | 2004031597 A1 | 4/2004 |
| WO | 2014143090 A1 | 9/2014 |

OTHER PUBLICATIONS

Hilliard, "ATB/UTV", Hilliard Motion Control Division, at least as early as Jan. 2, 2020, pp. 1-7, Hilliard Corporation.

Hilliard, "Gen III Front Drive System Differential Gearcase P/N 6203-01-256 Parts and Service Manual", Rev. 0, Nov. 12, 2007, pp. 1-6, Hilliard.

International Searching Authority, "International Search Report and Written Opinion from PCT Application No. PCT/US2020/018659", from Foreign Counterpart to U.S. Appl. No. 16/793,849, filed Jun. 5, 2020, pp. 1 through 18, Published: WO.

U.S. Patent and Trademark Office, "Notice of Allowance", U.S. Appl. No. 16/793,849, filed Mar. 10, 2021, pp. 1 through 7, Published: US.

U.S. Patent and Trademark Office, "Office Action", U.S. Appl. No. 16/793,849, filed Dec. 23, 2020, pp. 1 through 20, Published: US.

International Searching Authority, "International Search Report and Written Opinion", from PCT Application No. PCT/US2022/030705, from Foreign Counterpart to U.S. Appl. No. 17/399,334, dated Sep. 9, 2022, pp. 1 through 13, Published in: KR.

U.S. Patent and Trademark Office, "Notice of Allowance", U.S. Appl. No. 17/399,334, dated Nov. 10, 2022, pp. 1 through 9, Published: US.

U.S. Patent and Trademark Office, "Office Action", U.S. Appl. No. 17/399,334, dated Aug. 5, 2022, pp. 1 through 20, Published: US.

* cited by examiner

OVERRUNNING CLUTCH DIFFERENTIAL WITH A LOCKING MECHANISM

CROSS-REFERENCE TO RELATED APPLICATIONS

This application claims priority to U.S. Provisional Application Ser. No. 63/194,777, titled "OVERRUNNING CLUTCH FRONT DIFFERENTIAL WITH LOCKING MECHANISM" herewith, filed on May 28, 2021, which is incorporated in its entirety herein by reference.

BACKGROUND

Vehicle differentials transfer torque between a driveshaft and driven shafts (or half shafts). A differential allows the half shafts to rotate at different rotational speeds with relation to each other when a vehicle turns to prevent tire scrubbing, reduce transmission loads, and reduce understeering during cornering (the tendency of the vehicle to go straight in a corner). In four-wheel drive applications, bi-directional overrunning clutches (ORC) have been employed in differentials to transmit torque to the wheel via the half shafts when needed. For example, in a front differential example, the front differential is designed to transfer torque when the rear wheels are rotating faster than the front wheels.

Differentials with bi-directional ORC may include a clutch cam housing and hubs. It is desired to prevent inertial engagements between a clutch cam housing and hubs of the differential. One possible way of preventing inertial engagements is with the use of a centering spring. However, as the overrunning clutch applications increase in size, the inertia associated with the rollers and the roller cage increases and becomes a challenge to manage with just a centering spring. The increase in inertia also requires larger sized and loads requirements for coils used in locking mechanisms. This is an issue when a differential is needed with a small package.

SUMMARY OF INVENTION

The following summary is made by way of example and not by way of limitation. It is merely provided to aid the reader in understanding some of the aspects of the subject matter described. Embodiments provide a locking mechanism that allows for the use of low spring rates and smaller coil sizes then would otherwise be required in a differential with ORC functions.

In a first example, an ORC differential including a pinion, a ring gear, a clutch cam housing, a roller cage, a plurality of rollers, a cage centering spring, a first hub, a second hub and a locking mechanism is provided. The pinion is configured to be in operational communication with a transmission of a vehicle. The ring gear is operationally engaged with the pinion. The clutch cam housing is operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally coupled to the roller cage. The cage centering spring is engaged with roller cage and clutch cam housing and is configured to center each of the plurality of the rollers within an associated cam roller feature in the interior surface of the clutch cam housing. A first hub is at least in part received within a first portion of the roller cage. A portion of the first hub engages a first set of the plurality of rollers. The first hub configured to be in operational communication with a first half shaft. A second hub is at least in part received within a second portion of the roller cage. A portion of the second hub engages a second set of the plurality of rollers. The second hub configured to be in operational communication with a second half shaft. The locking mechanism is configured to lock rotation of the clutch cam housing to the roller cage to retain the centering of each roller in the associated cam roller feature to prevent torque from being communicated between the clutch cam housing and the first and second hubs when the locking mechanism is activated.

In another example, another ORC differential including a pinion, a ring gear, a clutch cam housing, a roller cage, a plurality of rollers, a cage centering spring, a first hub, a second hub and a locking mechanism is provided. The pinion is configured to be in operational communication with a transmission of a vehicle. The ring gear is operationally engaged with the pinion. The clutch cam housing is operationally engaged with the ring gear. The clutch cam housing included a central passage. An interior surface that defines the central passage of the clutch cam housing includes a plurality of cam roller features. The roller cage is received within the central passage of the clutch cam housing. The plurality of rollers are rotationally coupled to the roller cage. The cage centering spring is engaged with roller cage and clutch cam housing and is configured to center each of the plurality of the rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub at least in part received within a second portion of the roller cage. A portion of the second hub engages a second set of the plurality of rollers. The second hub is configured to be in operational communication with a second half shaft. The locking mechanism is configured to lock rotation of the clutch cam housing to the roller cage to retain the centering of each roller in the associated cam roller feature to prevent torque from being communicated between the clutch cam housing and the first and second hubs when the locking mechanism is activated. The locking mechanism includes an armature plate, a wave spring, and an electromagnetic coil. The armature plate engages the roller cage and selectively engages the clutch cam housing. The wave spring is positioned to assert a biasing force on the armature plate to selectively engage the clutch cam housing. The electromagnetic coil is positioned to selectively assert a force on the armature plate when activated that opposes the biasing force of the wave spring to selectively disengage the armature plate from the clutch cam housing.

In still another example, a vehicle including an overrunning clutch (ORC) differential, the vehicle including a motor, transmission, and at least one ORC differential, a memory, at least one sensor, and a controller is provided. The motor generates motor torque. The motor is in operational communication with the transmission. The at least one ORC differential selectively communicates torque between a pair of wheels and the transmission. The ORC differential includes a pinion, a ring gear, a clutch cam housing, a roller cage, a plurality of rollers, a cage centering spring, a first hub, a second hub and a locking mechanism. The pinion is configured to be in operational communication with the transmission. The ring gear operationally engaged with the pinion. The clutch cam housing is operationally engaged with the ring gear. The clutch cam housing includes a central passage. An interior surface that defines the central passage of the clutch cam housing includes a plurality of cam roller features. The roller cage received within the central passage of the clutch cam housing, the plurality of rollers are rotationally coupled to the roller cage. The cage centering spring engages the roller cage and clutch cam housing. The cage centering spring is configured to center each of the plurality of the rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub is at least in part received within a second portion of the roller cage. A portion of the second hub engages a second set of the plurality of rollers. The second hub is configured to be in operational communication with a second half shaft. The locking mechanism is configured to lock rotation of the clutch cam housing to the roller cage to retain the centering of each roller in the associated cam roller feature to prevent torque from being communicated between the clutch cam housing and the first and second hubs when the locking mechanism is activated. The memory is used to store operating instructions. The at least one sensor is configured to generate sensor signals. the controller is in communication with the memory and the at least one sensor. The controller is further configured to activate the locking mechanism based at least in part on the generated sensor signals from the at least one sensor and the operating instructions in the memory.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a locking mechanism that allows for the use of low spring rates and smaller coil sizes then would otherwise be required in a differential with ORC functions. The differential with ORC functions may be a front differential. However, other differentials may implement the ORC functions described herein. Accordingly, embodiments are not limited to a front differential.

Figure 1A:
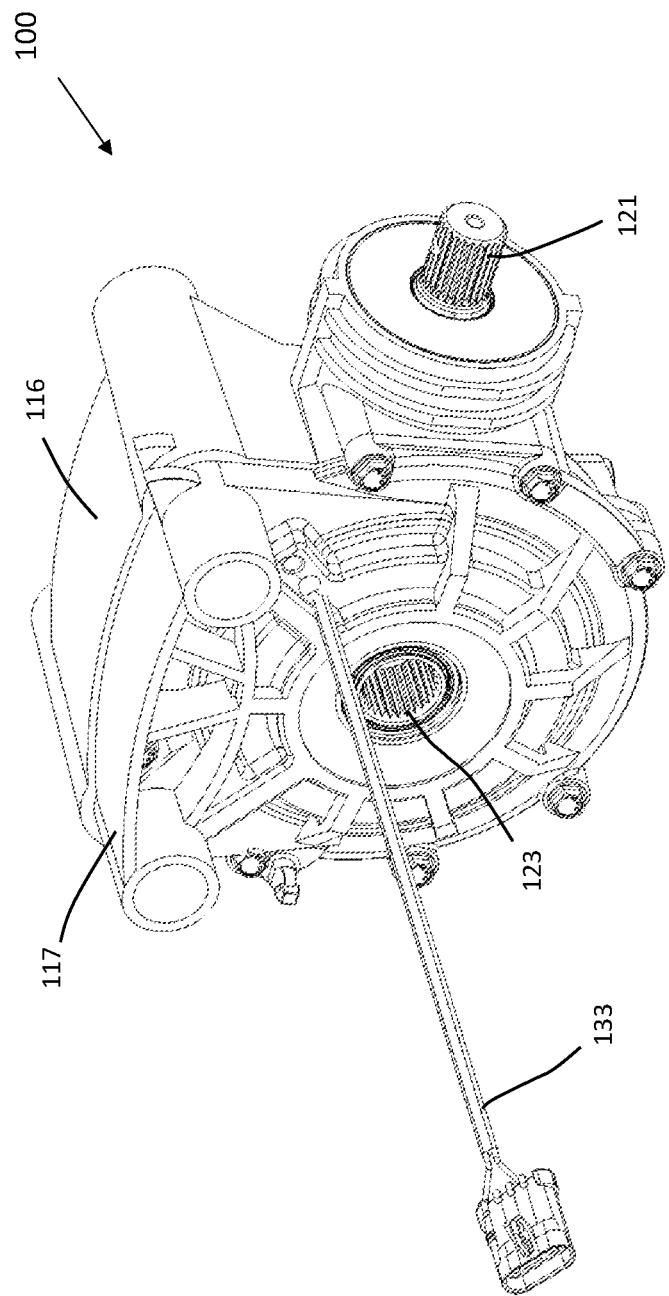
FIG. 1A is a first side perspective view of an assembled overrunning clutch front differential according to one exemplary embodiment.
Figure 1B:
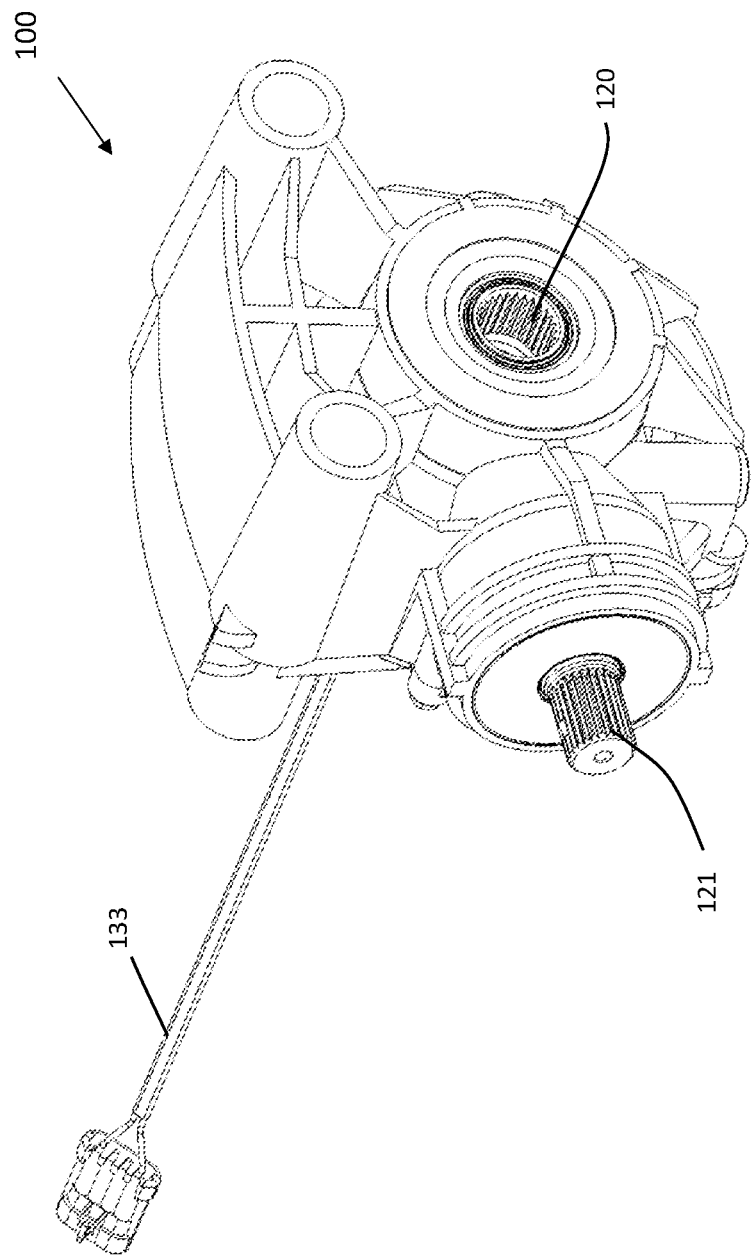
FIG. 1B is a second side perspective view of the assembled overrunning clutch front differential of FIG. 1A.

Referring to FIGS. 1A and 1B, a first side perspective view and a second side perspective view of an assembled overrunning clutch front differential 100 of one example embodiment is illustrated. The assembled overrunning clutch front differential 100 in these Figures is illustrated as including a differential housing that includes a case 116 with a cover 117. An end of a pinion 121 that passes through a passage in the case 116. Also illustrated is an activation input cable 133 that is used to selectively activate an electromagnet or electromagnetic coil as discussed below.

Figure 2A:
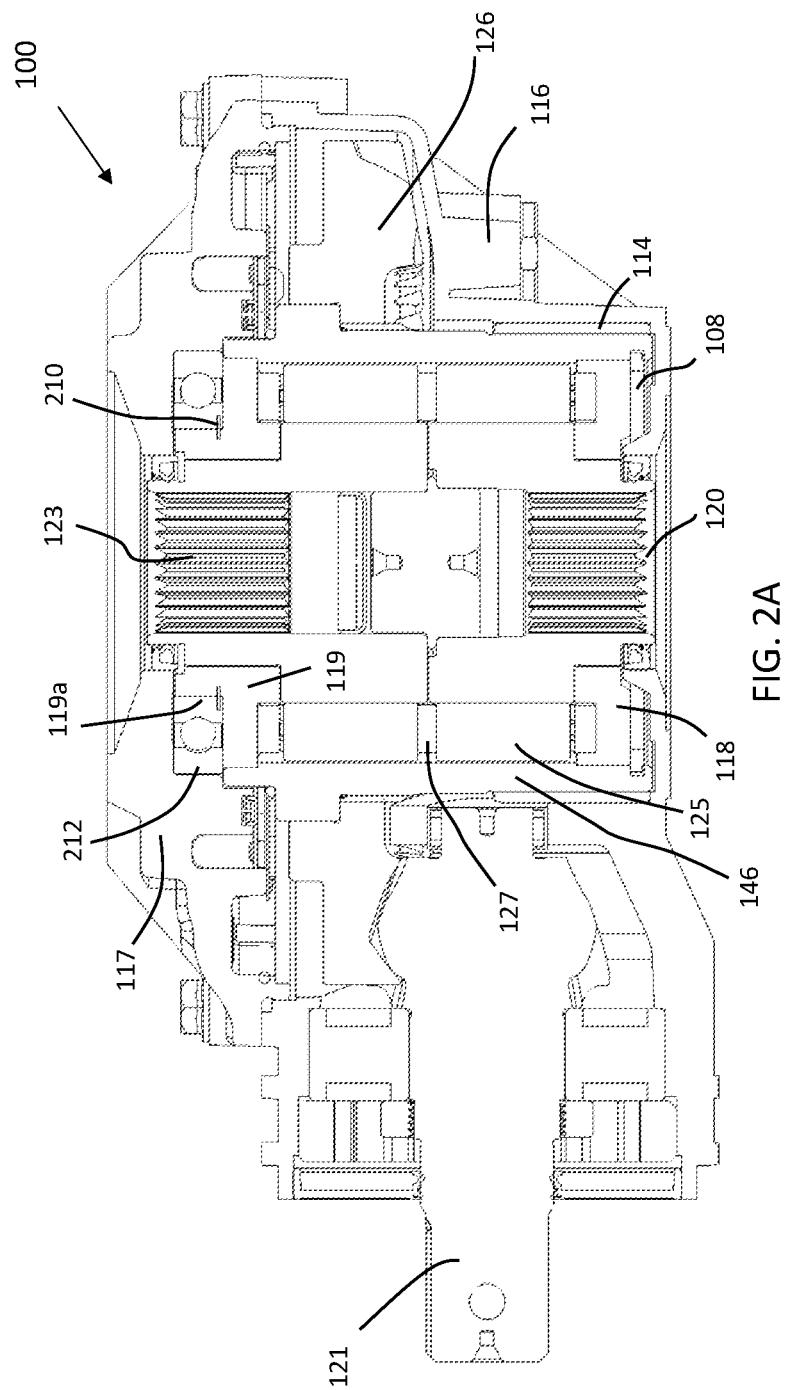
FIG. 2A is a cross-sectional side view of an assembled overrunning clutch front differential according to one exemplary embodiment.
Figure 2B:
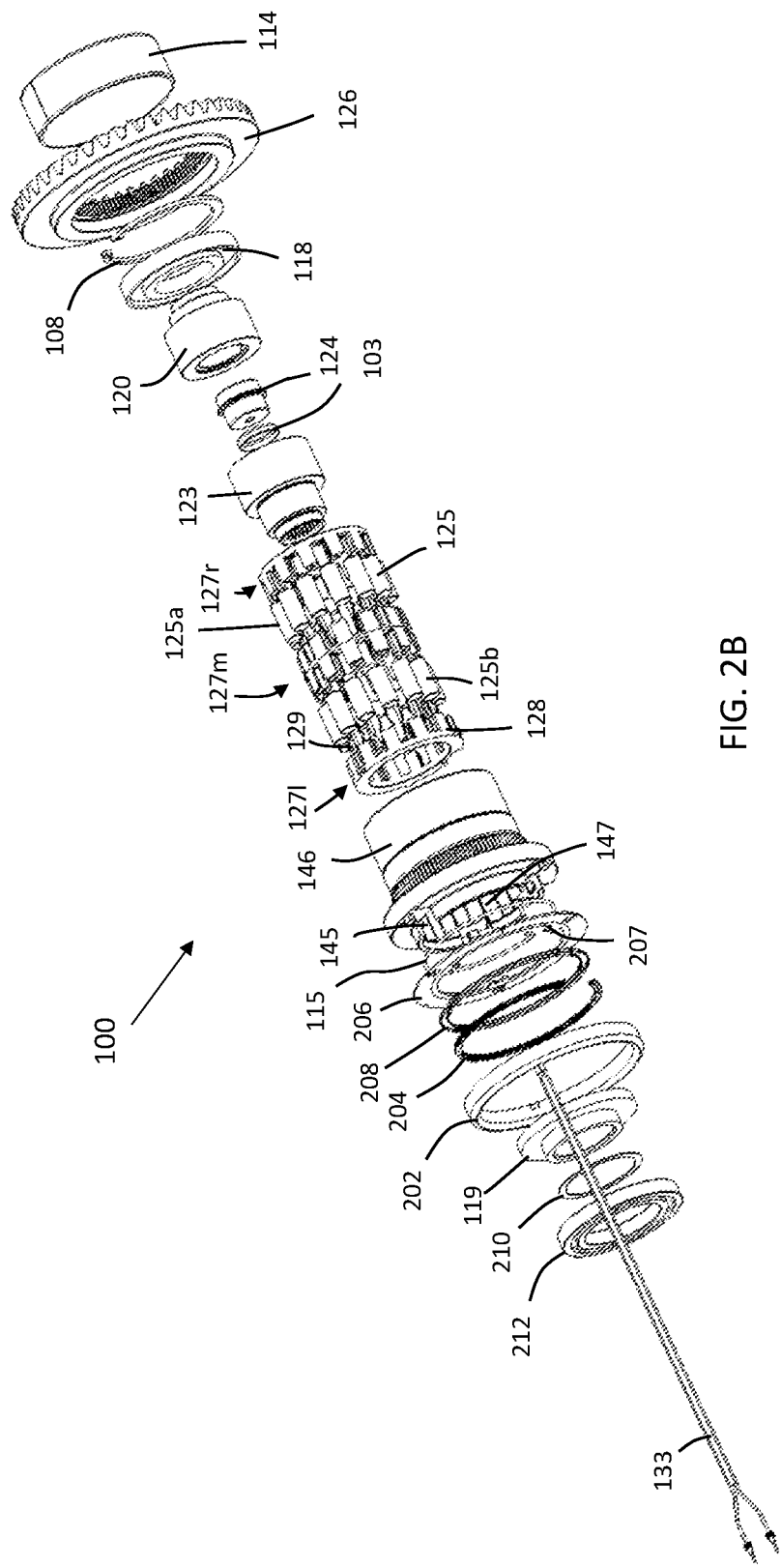
FIG. 2B is an unassembled side view of a portion of the overrunning clutch front differential according to one exemplary embodiment.

A cross-sectional view of the assembled overrunning clutch differential 100 is illustrated in FIG. 2A and an exploded view of the overrunning clutch differential 100 is illustrated in FIG. 2B. The overrunning clutch front differential 100 includes a roller cage (generally denoted by 127) which includes a left roller cage portion 127*l*, a middle roller cage portion 127*m* and a right roller cage portion 127*r*. Rollers 125 are rotationally mounted to the roller cage 127. The rollers 125 include a first set of rollers 125*a* and a second set of rollers 125*b* in this example. The roller cage 127 further includes H-clip springs 129. The roller cage 127 is received within a clutch cam housing 146. An interior surface of the clutch cam housing 146 include cam roller features 147. The cam roller features 147 are formed into the interior surface of the clutch cam housing 146. Each roller 125 of the roller cage 127 is positioned to be aligned within an associated cam roller feature 147 within the interior surface of the clutch cam housing 146.

Received within the roller cage 127 is a first hub 120 and a second hub 123 that are centered within the roller cage with a centering hub 124. The first set of rollers 125a are positioned to engage a first outer surface portion of the first hub 120 and the second set of rollers 125b are positioned to engage a first outer surface portion of the second hub 123. An oil seal 103 is positioned between the centering hub 124 and the second hub 123.

A first end cap 118 is designed to be mounted on a second outer portion of the first hub 120 and a second end cap 119 is designed to be mounted on a second outer portion of the second hub 123. A first end of the roller cage 127 engages a first side portion of the first end cap 118 and a second end of the roller cage 127 engages a first side portion of the second end cap 119. Further mounted on a portion of the second end cap 119 is a backlash shim 210 and a ball bearing 212. Bearing 212 in this example includes an inside surface that engages an outer bearing seating surface 119a of the second end cap 119. An outside surface of the bearing 212 in this example engaging an inside surface of the cover 117 of the differential housing. A retainer ring 108 that engages the clutch cam housing 146 and is positioned to abut the first end cap 118 retains the assembly within the clutch cam housing 146. The assembly including at least the first end cap 118, the roller cage 127 and the rollers 125. A bushing 114 is positioned between an outer surface of the clutch cam housing 146 and an interior surface of the case 116 of the differential housing.

A ring gear 126 is statically mounted on the clutch cam housing 146 in this example embodiment via spline connection so that when the ring gear 126 moves, the clutch cam housing 146 moves and vice versa. In another embodiment, the ring gear and clutch cam housing are formed as one piece. The ring gear 126 is engaged with the pinion 121 to receive rotational toque from a transmission (not shown). The respective first and second hubs 120 and 123 are coupled to half shafts (not shown) which in turn are coupled to respective front wheels. Embodiments selectively couple torque between the ring gear 126 and the first and second hubs 120 and 123 to selectively drive the front wheels of an associated vehicle.

The overrunning clutch differential 100 further includes a cage centering spring 115 that engages the clutch cam housing 146 and roller cage 127 to center each roller 125 within its associated cam roller feature 147 with a biasing force so the rollers 125 do not engage the interior surface of the clutch cam housing 146 and no torque is transfer between the ring gear 126 and the first and second hubs 120 and 123 when a countering force is not present. When a countering force is present, the clutch cam housing 146 rotates in relation to the roller cage 127 moving the rollers 125 from the center of their associated cam roller feature 147 to engage a cam portion of an associated cam feature 147 to transfer torque between the clutch cam housing 146 and the ring gear 126.

A locking mechanism includes an armature plate 206, a spring cup 208, a wave spring 204 and an electromagnetic coil 202. The electromagnetic coil 202 may just be an electromagnet in an example. In one embodiment, the spring cup 208 acts as a bearing surface between the armature plate 206 that may be spinning at vehicle speed and the wave spring 204 that is connected to ground (cover 117). The armature plate 206 includes a plurality of armature locking tabs 207 that are designed to selectively engage the clutch cam housing 146 and the roller cage 127 to lock rotation of the clutch cam housing 146 with the roller cage 127 as discussed below in detail. The engaging tabs extend radially inward in a central passage of the armature plate 206.

Figure 3:
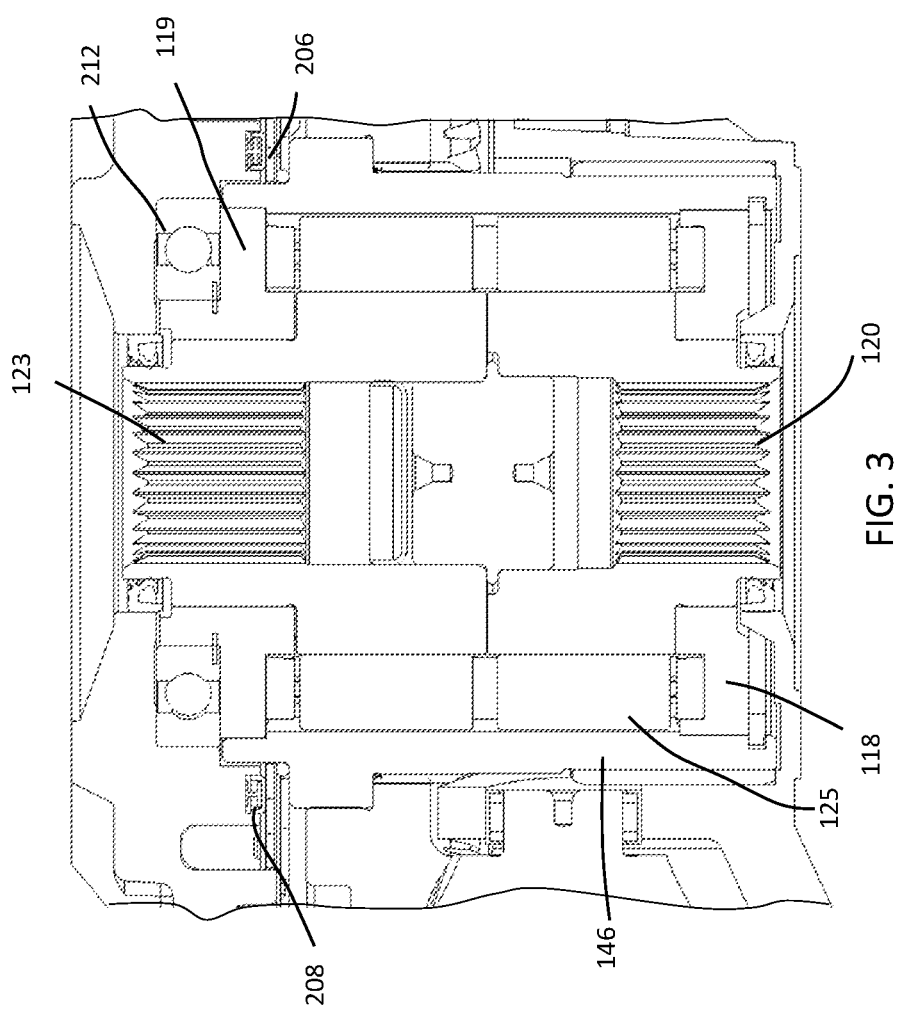
FIG. 3 is a close-up side view of a portion of the overrunning clutch front differential according to one exemplary embodiment.
Figure 4:
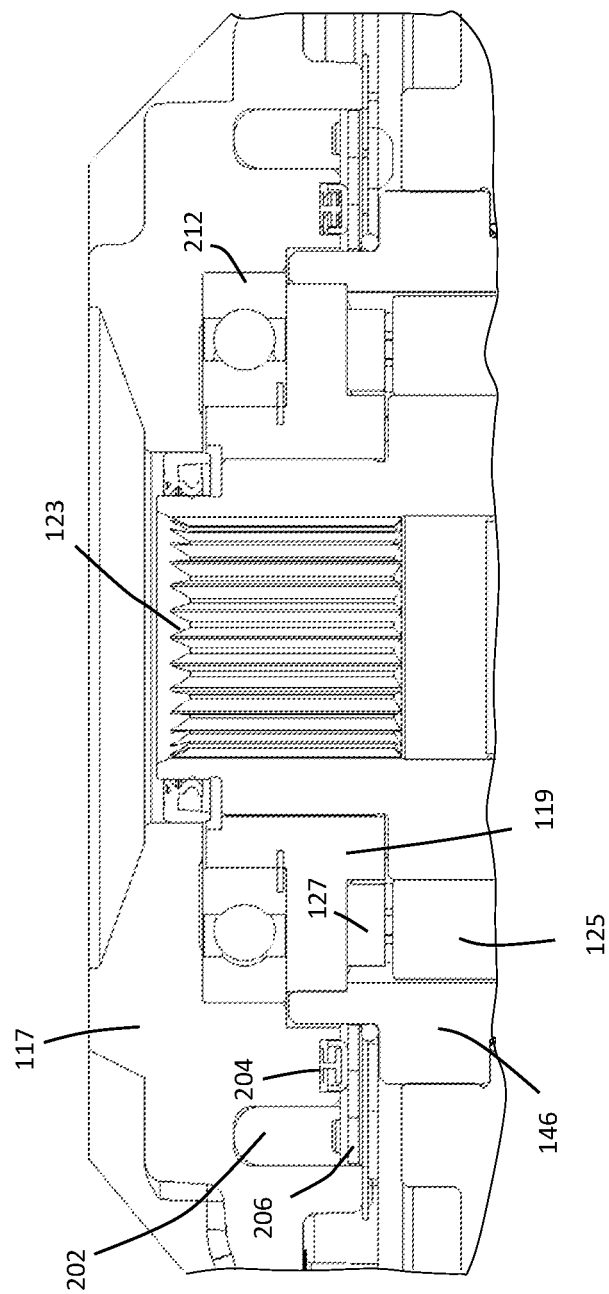
FIG. 4 is another close-up side view of a portion of the overrunning clutch front differential according to one exemplary embodiment.
Figure 5:
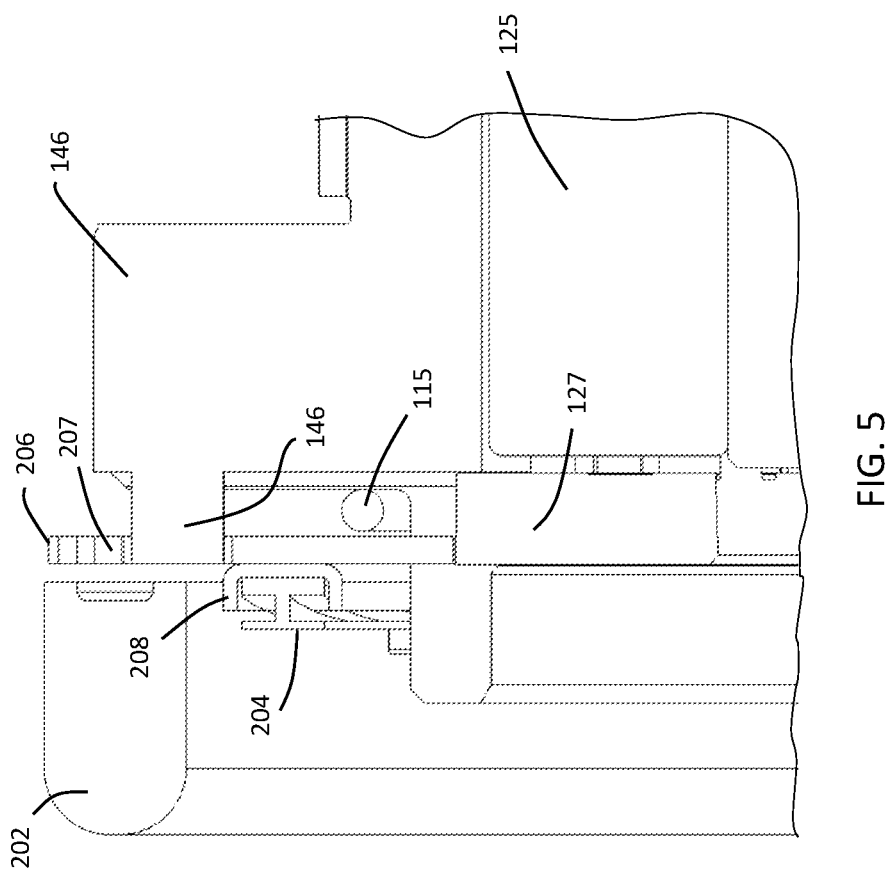
FIG. 5 is a close-up side view of a portion of the overrunning clutch front differential illustrating a portion of the locking mechanism according to one exemplary embodiment.

FIGS. 3 and 4 illustrate further cross-sectional close-up views of the overrunning clutch front differential 100. FIG. 5 illustrates a cross-sectional close-up view of a portion of the locking mechanism. In this view the electromagnetic coil 202 is not activated. When the electromagnet is not activated, the wave spring 204 pushes the armature plate 206 to engage the clutch cam housing 146 and the roller cage 127 therein locking rotation of the clutch cam housing 146 with the rotation of the roller cage 127 and vice versa. Locking the clutch cam housing 146 to the roller cage 127 retains the centering of each roller 125 in its associated cam roller feature 147 so the rollers 125 do not engage the interior surface of the clutch cam housing 146 and no torque is transfer between the ring gear 126 and the first and second hubs 120 and 123. This configuration prevents unintended inertial engagements of the overrunning clutch ORC mechanism (i.e., prevents self-energizing).

When the electromagnetic coil 202 is activated, a magnetic force overcomes the bias force of the wave spring 204 causing the ferrous armature plate 206 to move toward electromagnetic coil 202. This movement disengages the armature plate 206 from the clutch cam housing 146. In some embodiments, the armature plate 206 remains coupled to the roller cage 127. This allows the roller cage 127 to move in relation to the clutch cam housing 146 when an overrunning clutch ORC function is requested from the rider. The magnetic force from the electromagnetic coil 202 is created by selectively passing a current through the electromagnetic coil 202.

Figure 6:
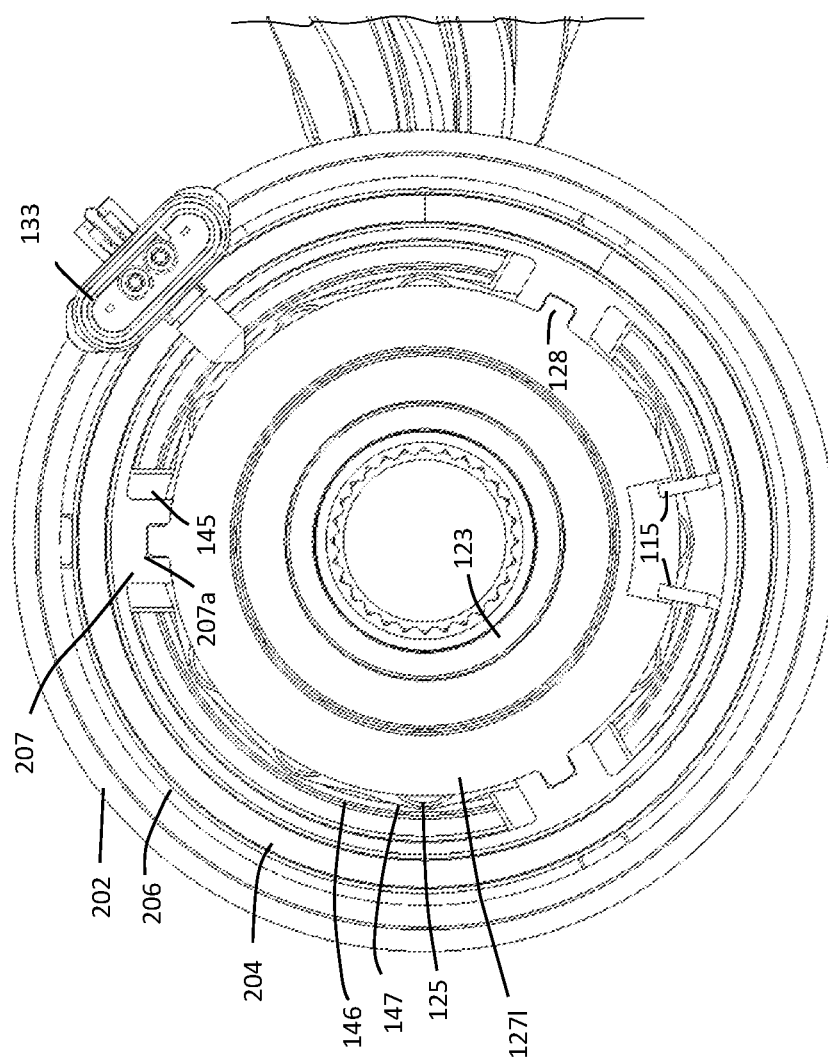
FIG. 6 is a close-up end view of a portion of the overrunning clutch front differential according to one exemplary embodiment.

FIG. 6 illustrates a cross-sectional end view of a portion of the locking mechanism. FIG. 6 illustrates the configuration of the armature engaging tabs 207 of the armature plate 206 (best illustrate in FIG. 7). Each armature engaging tab 207 includes a cage receiving notch 207a that is configured to receive a cage engagement tab 128 of the roller cage 127. The armature engaging tab 207 is further designed to fit in slots 145 (or dogs) in a first end of the clutch cam housing 146 when locking rotation of the clutch cam housing 146 and roller cage 127 together.

As discussed above, when the electromagnetic coil 202 is off, the wave spring 204, which is connected to ground (one side abuts the cover 117), acts on the armature plate 206 (asserts a bias force on the armature plate 206) which initiates a locked configuration between the clutch cam housing 146 and the roller cage 127. This locked configuration prevents unintentional inertial engagements of the overrunning clutch mechanism (i.e., it prevents self-energizing) as discussed above. Referring to FIG. 6, in this locked configuration, the rollers 125 are centered in their associated cam roller features 147 so the first and second hubs 120 and 123 are free to rotate in relation to the roller cage 127 and clutch cam housing 146.

When the electromagnetic coil 202 is activated, a magnetic attraction force generated by the coil 202 axially pulls the armature plate 206 to the electromagnetic coil 202 countering the bias force of the wave spring 204. This disconnects the armature plate 206 from the clutch cam housing 146 while remaining connected to the roller cage 127 as discussed below. This allows the roller cage 127 to rotate when the ORC function is requested from the rider. During an ORC condition the roller cage 127 moves in relation to the clutch cam housing 146 causing the rollers 125 to engage the cam surfaces of the cam roller features 147 in the inner surface of the clutch cam housing 146 therein allowing torque to be communicated between respective first and second hubs 120 and 123 and the clutch cam housing 146 during an ORC condition.

Also illustrated in FIG. 6 is how ends of the centering spring 115 pass through windows in the clutch cam housing 146 to engage the roller cage 127. In the embodiment shown, the cage centering spring 115 is radially larger that the central passage of the clutch cam housing 146.

Figure 7:
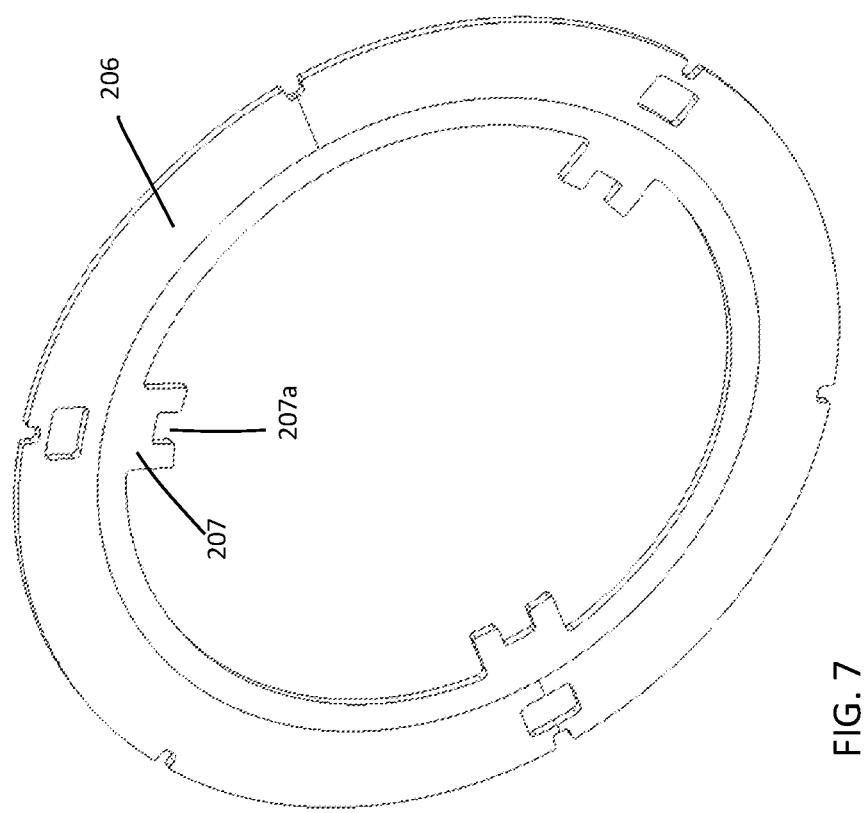
FIG. 7 illustrates an end perspective view of an armature plate 206 of one example embodiment.

FIG. 7 illustrates an end perspective of an embodiment of the armature plate 206. As illustrated, the armature plate 206 includes the plurality of radially inward extending armature engaging tabs 207. Each armature engaging tab 207 in this example embodiment includes a cage receiving notch 207*a* to receive a cage engagement tab 128 discussed above. The armature plate 206 further includes locking passages 206*a* that are aligned in this example with an associated armature engaging tab 207.

Figure 8:
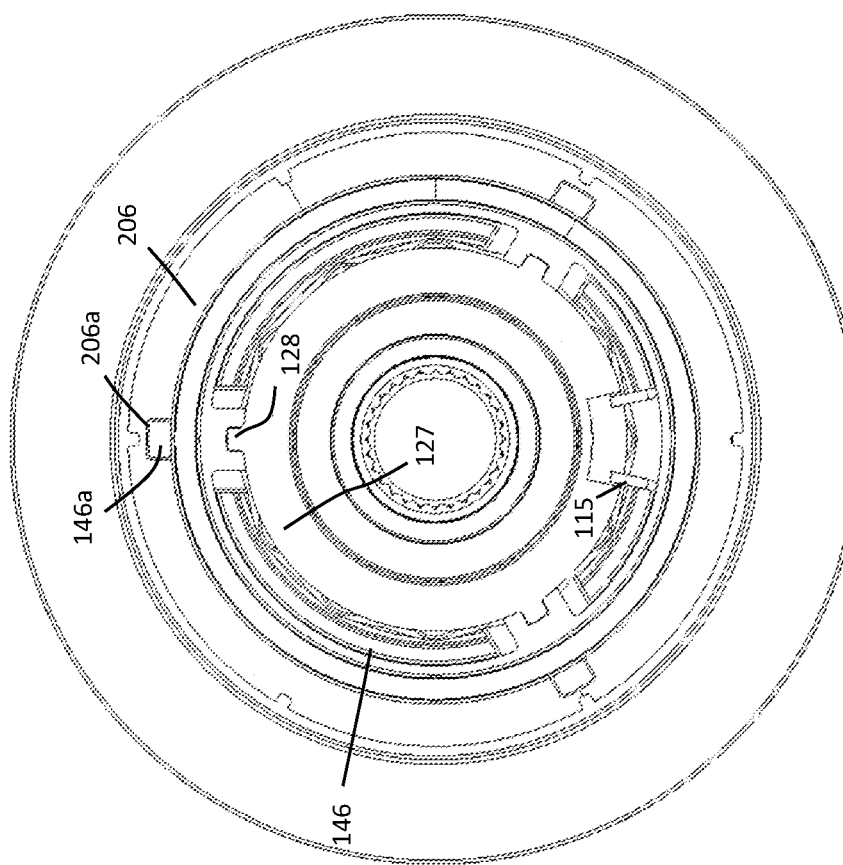
FIG. 8 illustrated an end view of the armature plate, clutch cam housing 146 and the roller cage 127 in a locked configuration according to one exemplary embodiment.
Figure 9A:
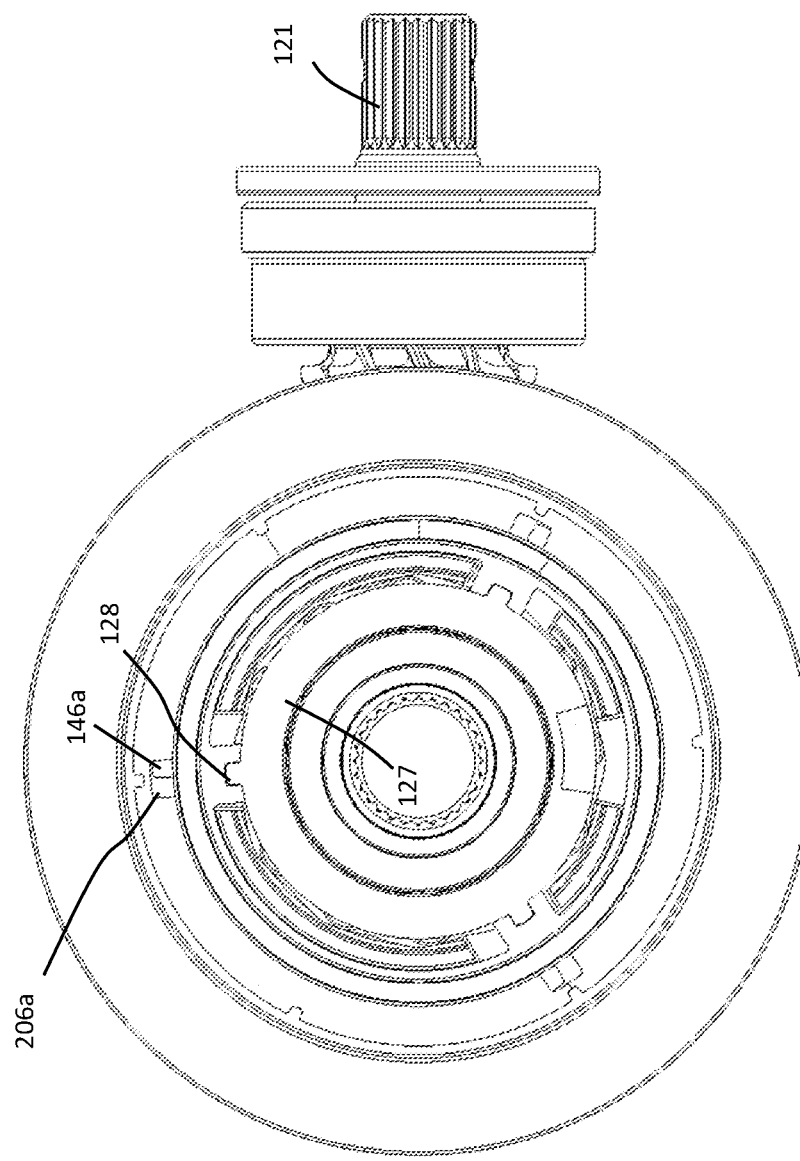
FIG. 9A illustrates an end view of the armature plate, clutch cam housing 146 and the roller cage 127 in an unlocked configuration according to one exemplary embodiment.
Figure 9B:
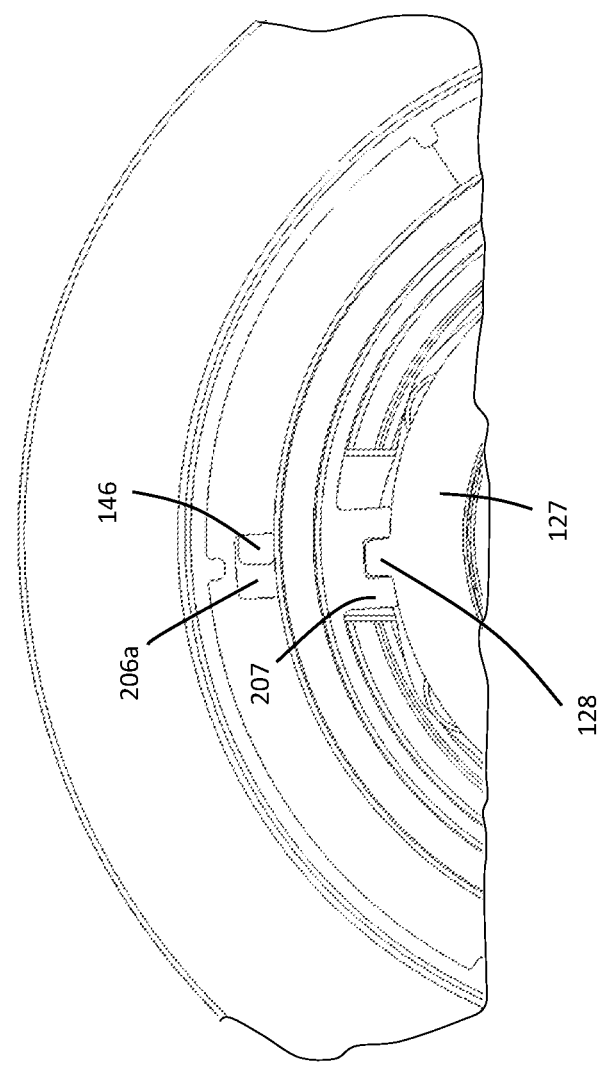
FIG. 9B illustrates a close-up end view of the armature plate, clutch cam housing 146 and the roller cage 127 in the unlocked configuration according to one exemplary embodiment.

FIG. 8 further illustrates an end view without the coil that illustrates the housing locking tabs 146*a* of the clutch cam housing 146 received in associated locking passages 206*a* of the armature plate 206 when the clutch cam housing 146 is locked to the roller cage 127. The end views in FIGS. 9A and 9B illustrate the armature plate 206 being disengaged from the clutch cam housing 146 while still being engaged with the roller cage 127. This configuration occurs when the electromagnetic coil 202 is activated. In this configuration, the housing locking tabs 146*a* of the clutch cam housing 146 are no longer in the associated locking passages 206*a* of the armature plate. Further the armature engaging tabs 207 are not engaged with the slots 145 (or dogs) of the clutch cam housing 146. However, the cage engagement tab 128 remains in the notch 207*a* of the armature engagement tabs 207 so the armature plate remains coupled to the roller cage 127 in one example embodiment.

Figure 10:
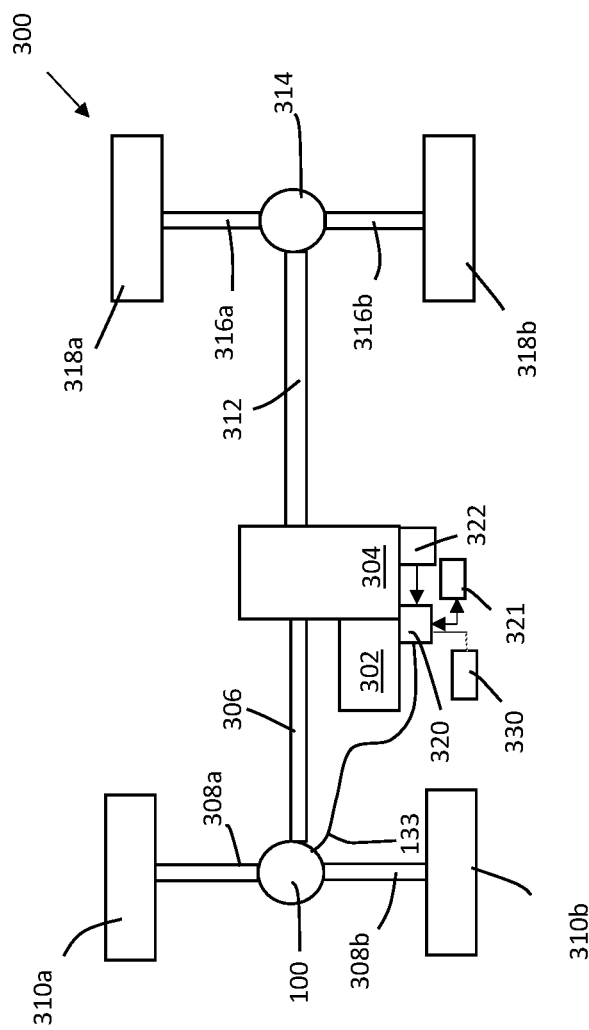
FIG. 10 is a block diagram of a vehicle that includes an overrunning clutch front differential according to one exemplary embodiment.

FIG. 10 illustrates a block diagram of a vehicle 300 that includes an overrunning clutch differential 100 as described above according to an example embodiment. The vehicle 300 is illustrated as including a motor 302 that generates engine torque that is communicated to a transmission 304. The motor may by any type of motor, including but not limited to, an electric motor and an internal combustion engine, that produces engine torque. The transmission 304 may include a continuously variable transmission and/or a gear box.

A front prop shaft 306 communicates torque between the transmission 304 and the overrunning clutch differential 100 in this example. The overrunning clutch differential 100 is in rotational communication with front wheels 310*a* and 310*b* via respective front half shafts 308*a* and 308*b*.

A rear prop shaft 312 communicates torque between the transmission 304 and rear differential 314 in this example. The rear differential 314 is in rotational communication with rear wheels 318*a* and 318*b* via respective back half shafts 316*a* and 316*b*.

The vehicle 300 also includes a controller 320 that is in communication with a memory 321 and one or more sensors 322. The memory 321 at least stores operating instructions implemented by the controller 320. The controller 320 is further in communication with the activation input cable 133 that is used to selectively activate the electromagnetic coil 202. The controller 320 selectively activates the electromagnetic coil 202 based on sensor signals from the one or more sensors 322 and the operating instructions stored in the memory 321. The sensors 322 may include, but are not limited to, speed sensors, acceleration sensors, torque sensors, throttle position sensors, braking sensors, and temperature sensors. In one example, the controller 320 directs current from a power source 330 through the input cable 133 to selectively activate the electromagnetic coil 202.

In general, the controller 320 may include any one or more of a processor, microprocessor, a digital signal processor (DSP), an application specific integrated circuit (ASIC), a field program gate array (FPGA), or equivalent discrete or integrated logic circuitry. In some example embodiments, controller 320 may include multiple components, such as any combination of one or more microprocessors, one or more controllers, one or more DSPs, one or more ASICs, one or more FPGAs, as well as other discrete or integrated logic circuitry. The functions attributed to the controller 320 herein may be embodied as software, firmware, hardware or any combination thereof. The controller 320 may be part of a system controller or a component controller such as, but not limited to, an engine control module, transmission control module etc. The memory 321 may include computer-readable operating instructions that, when executed by the controller 320 provides control functions of the overring clutch differential 100. Such functions may include the functions of the locking mechanism of the overriding clutch differential 100 described above. The computer readable instructions may be encoded within the memory 321. Memory 321 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage medium.

EXAMPLE ASPECTS

Example 1 is an ORC differential including a pinion, a ring gear, a clutch cam housing, a roller cage, a plurality of rollers, a cage centering spring, a first hub, a second hub and a locking mechanism. The pinion is configured to be in operational communication with a transmission of a vehicle. The ring gear is operationally engaged with the pinion. The clutch cam housing is operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally coupled to the roller cage. The cage centering spring is engaged with roller cage and clutch cam housing and is configured to center each of the plurality of the rollers within an associated cam roller feature in the interior surface of the clutch cam housing. A first hub is at least in part received within a first portion of the roller cage. A portion of the first hub engages a first set of the plurality of rollers. The first hub configured to be in operational communication with a first half shaft. A second hub is at least in part received within a second portion of the roller cage. A portion of the second hub engages a second set of the plurality of rollers. The second hub configured to be in operational communication with a second half shaft. The locking mechanism is configured to lock rotation of the clutch cam housing to the roller cage to retain the centering of each roller in the associated cam roller feature to prevent torque from being communicated between the clutch cam housing and the first and second hubs when the locking mechanism is activated.

Example 2 includes the ORC differential of Example 1, wherein the locking mechanism further includes an armature plate engaging the roller cage and selectively engaging the clutch cam housing.

Example 3 includes the ORC differential of Example 2, wherein the locking mechanism further includes a wave spring and an electromagnetic coil. The wave spring is positioned to assert a biasing force on the armature plate to selectively engage the clutch cam housing. The electromagnetic coil is positioned to selectively assert a force on the armature plate when activated that opposes the biasing force of the wave spring to selectively disengage the armature plate from the clutch cam housing.

Example 4 includes the ORC differential of Example 3, further including a spring cup engaging a first side of the wave spring. The spring cup is positioned to act as a bearing surface between the armature plate and the wave spring.

Example 5 includes the ORC differential of any of the Examples 2-3, wherein the armature plate further includes armature locking tabs configured to be received within slots in a first end of the clutch cam housing to selectively lock rotation of the clutch cam housing to the roller cage.

Example 6 includes the ORC differential of Example 5, wherein the armature locking tabs extend radially inward from a central passage of the armature plate.

Example 7 includes the ORC differential of Example 6, wherein each armature locking tab includes a cage receiving notch that is configured to receive a cage tab of the roller cage.

Example 8 includes the ORC differential of any of the Examples 1-7, wherein the cage centering spring is connected to the roller cage through windows in the clutch cam housing.

Example 9 includes the ORC differential of and of the Examples 1-8, further including a first end cap, a second end cap and a bearing. The first end cap is seated within a first end of the clutch cam housing. The second end cap is at least partially seated within a second end of the clutch cam housing. The roller cage is retained between the first end cap and the second end cap. The bearing includes an inside surface and an outside surface. The inside surface of the bearing engages an outer bearing seating surface of the second end cap. The outside surface of the bearing engages an inside surface of the differential housing.

Example 10 includes the ORC differential of Example 9, further including a retainer ring that engages the clutch cam housing. The retainer ring is further positioned to abut the first end cap to retain at least the roller cage, the plurality of rollers and the first end cap within the clutch cam housing.

Example 11 includes an ORC differential including a pinion, a ring gear, a clutch cam housing, a roller cage, a plurality of rollers, a cage centering spring, a first hub, a second hub and a locking mechanism. The pinion is configured to be in operational communication with a transmission of a vehicle. The ring gear is operationally engaged with the pinion. The clutch cam housing is operationally engaged with the ring gear. The clutch cam housing included a central passage. An interior surface that defines the central passage of the clutch cam housing includes a plurality of cam roller features. The roller cage is received within the central passage of the clutch cam housing. The plurality of rollers are rotationally coupled to the roller cage. The cage centering spring is engaged with roller cage and clutch cam housing and is configured to center each of the plurality of the rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub at least in part received within a second portion of the roller cage. A portion of the second hub engages a second set of the plurality of rollers. The second hub is configured to be in operational communication with a second half shaft. The locking mechanism is configured to lock rotation of the clutch cam housing to the roller cage to retain the centering of each roller in the associated cam roller feature to prevent torque from being communicated between the clutch cam housing and the first and second hubs when the locking mechanism is activated. The locking mechanism includes an armature plate, a wave spring, and an electromagnetic coil. The armature plate engages the roller cage and selectively engages the clutch cam housing. The wave spring is positioned to assert a biasing force on the armature plate to selectively engage the clutch cam housing. The electromagnetic coil is positioned to selectively assert a force on the armature plate when activated that opposes the biasing force of the wave spring to selectively disengage the armature plate from the clutch cam housing.

Example 12 includes the ORC differential of Example 11, wherein the armature plate includes armature locking tabs configured to be received within slots in a first end of the clutch cam housing to selectively lock rotation of the clutch cam housing to the roller cage.

Example 13 includes the ORC differential of Example 12, wherein the armature locking tabs extend radially inward from a central passage of the armature plate. Each armature locking tab includes a cage receiving notch that is configured to receive a cage tab of the roller cage.

Example 14 includes the ORC differential of any of the Examples 11-13, further including a spring cup engaging a first side of the wave spring. The spring cup positioned to act as a bearing surface between the armature plate and the wave spring.

Example 15 includes the ORC differential of any of the Examples 11-14, further including a first end cap, a second end cap and a bearing. The first end cap is seated within a first end of the clutch cam housing. The second end cap is at least partially seated within a second end of the clutch cam housing. The roller cage is retained between the first end cap and the second end cap. The bearing includes an inside surface and an outside surface. The inside surface of the bearing engages an outer bearing seating surface of the second end cap. The outside surface of the bearing engages an inside surface of the differential housing.

Example 16 includes the ORC differential of any of the Examples 11-15, wherein the cage centering spring is connected to the roller cage through windows in the clutch cam housing.

Example 17 includes a vehicle including an ORC differential, the vehicle including a motor, transmission, and at least one ORC differential, a memory, at least one sensor, and a controller. The motor generates motor torque. The motor is in operational communication with the transmission. The at least one ORC differential selectively communicates torque between a pair of wheels and the transmission. The ORC differential includes a pinion, a ring gear, a clutch cam housing, a roller cage, a plurality of rollers, a cage centering spring, a first hub, a second hub and a locking mechanism. The pinion is configured to be in operational communication with the transmission. The ring gear operationally engaged with the pinion. The clutch cam housing is operationally engaged with the ring gear. The clutch cam housing includes a central passage. An interior surface that defines the central passage of the clutch cam housing includes a plurality of cam roller features. The roller cage received within the central passage of the clutch cam housing, the plurality of rollers are rotationally coupled to the roller cage. The cage centering spring engages the roller cage and clutch cam housing. The cage centering spring is configured to center each of the plurality of the rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub is at least in part received within a second portion of the roller cage. A portion of the second hub engages a second set of the plurality of rollers. The second hub is configured to be in operational communication with a second half shaft. The locking mechanism is configured to lock rotation of the clutch cam housing to the roller cage to retain the centering of each roller in the associated cam roller feature to prevent torque from being communicated between the clutch cam housing and the first and second hubs when the locking mechanism is activated. The memory is used to store operating instructions. The at least one sensor is configured to generate sensor signals. the controller is in communication with the memory and the at least one sensor. The controller is further configured to activate the locking mechanism based at least in part on the generated sensor signals from the at least one sensor and the operating instructions in the memory.

Example 18 includes the vehicle of Example 17, wherein the locking mechanism further includes an armature plate, a wave spring, an electromagnetic coil, and spring cup. The armature plate engages the roller cage and selectively engages the clutch cam housing. The wave spring is positioned to assert a biasing force on the armature plate to selectively engage the clutch cam housing. An electromagnetic coil is positioned to selectively assert a force on the armature plate when activated that opposes the biasing force of the wave spring to selectively disengage the armature plate from the clutch cam housing. The spring cup engages a first side of the wave spring. The spring cup is positioned to act as a bearing surface between the armature plate and the wave spring.

Example 19 includes the vehicle of Example 18, wherein the armature plate further includes armature locking tabs. The armature locking tabs are configured to be received within slots in a first end of the clutch cam housing to selectively lock rotation of the clutch cam housing to the roller cage. The armature locking tabs extend radially inward from a central passage of the armature plate. Each armature locking tab further includes a cage receiving notch that is configured to receive a cage tab of the roller cage.

Example 20 includes the vehicle of any of the Examples 17-19, further comprising a first end cap, a second end cap, a bearing, and a retainer ring. The first end cap is seated within a first end of the clutch cam housing. The second end cap is at least partially seated within a second end of the clutch cam housing. The roller cage is retained between the first end cap and the second end cap. The bearing includes an inside surface and an outside surface. The inside surface of the bearing engages an outer bearing seating surface of the second end cap. The outside surface of the bearing engages an inside surface of the differential housing. The retainer ring engages the clutch cam housing. The retainer ring is further positioned to abut the first end cap to retain at least the roller cage, the plurality of rollers, and the first end cap within the clutch cam housing.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An overrunning clutch (ORC) differential comprising:
    a pinion configured to be in operational communication with a transmission of a vehicle;
    a ring gear operationally engaged with the pinion;
    a clutch cam housing operationally engaged with the ring gear, the clutch cam housing including a central passage, an interior surface that defines the central passage of the clutch cam housing including a plurality of roller features;
    a roller cage received within the central passage of the clutch cam housing;
    a plurality of rollers rotationally coupled to the roller cage;
    a cage centering spring engaged with both the roller cage and the clutch cam housing, the cage centering spring generating a biasing force between the roller cage and clutch cam housing to position the roller cage in relation to the clutch cam housing so that each of the plurality of the rollers that are rotationally coupled to the roller cage are centered within an associated roller feature in the interior surface of the clutch cam housing when a countering force is not present;
    a first hub at least in part received within a first portion of the roller cage, a portion of the first hub engaging a first set of the plurality of rollers, the first hub configured to be in operational communication with a first half shaft;
    a second hub at least in part received within a second portion of the roller cage, a portion of the second hub engaging a second set of the plurality of rollers, the second hub configured to be in operational communication with a second half shaft; and
    a locking mechanism configured to lock rotation of the clutch cam housing to the roller cage to retain the centering of each roller in the associated roller feature to prevent torque from being communicated between the clutch cam housing and the first and second hubs when the locking mechanism is activated.

2. The ORC differential of claim 1, wherein the locking mechanism further comprises:
    an armature plate engaging the roller cage and selectively engaging the clutch cam housing.

3. The ORC differential of claim 2, wherein the locking mechanism further comprises:
    a wave spring positioned to assert a biasing force on the armature plate to selectively engage the clutch cam housing; and
    an electromagnetic coil positioned to selectively assert a force on the armature plate when activated that opposes the biasing force of the wave spring to selectively disengage the armature plate from the clutch cam housing.

4. The ORC differential of claim 3, further comprising:
    a spring cup engaging a first side of the wave spring, the spring cup positioned to act as a bearing surface between the armature plate and the wave spring.

5. The ORC differential of claim 2, wherein the armature plate further comprises:
    armature locking tabs configured to be received within slots in a first end of the clutch cam housing to selectively lock rotation of the clutch cam housing to the roller cage.

6. The ORC differential of claim 5, wherein the armature locking tabs extend radially inward from a central passage of the armature plate.

7. The ORC differential of claim 6, wherein each armature locking tab includes a cage receiving notch that is configured to receive a cage tab of the roller cage.

8. The ORC differential of claim 1, wherein the cage centering spring is connected to the roller cage through windows in the clutch cam housing.

9. The ORC differential of claim 1, further comprising:
a first end cap seated within a first end of the clutch cam housing;
a second end cap at least partially seated within a second end of the clutch cam housing, the roller cage retained between the first end cap and the second end cap; and
a bearing including an inside surface and an outside surface, the inside surface of the bearing engaging an outer bearing seating surface of the second end cap, the outside surface of the bearing engaging an inside surface of a differential housing.

10. The ORC differential of claim 9, further comprising:
a retainer ring engaging the clutch cam housing, the retainer ring further positioned to abut the first end cap to retain at least the roller cage, the plurality of rollers and the first end cap within the clutch cam housing.

11. An overrunning clutch (ORC) differential comprising:
a pinion configured to be in operational communication with a transmission of a vehicle;
a ring gear operationally engaged with the pinion;
a clutch cam housing operationally engaged with the ring gear, the clutch cam housing including a central passage, an interior surface that defines the central passage of the clutch cam housing including a plurality of roller features;
a roller cage received within the central passage of the clutch cam housing;
a plurality of rollers rotationally coupled to the roller cage;
a cage centering spring engaged with both the roller cage and clutch cam housing, the cage centering spring configured to position the roller cage in relation to the clutch cam housing to center each of the plurality of the rollers that are rotationally coupled to the roller cage within an associated roller feature in the interior surface of the clutch cam housing;
a first hub at least in part received within a first portion of the roller cage, a portion of the first hub engaging a first set of the plurality of rollers, the first hub configured to be in operational communication with a first half shaft;
a second hub at least in part received within a second portion of the roller cage, a portion of the second hub engaging a second set of the plurality of rollers, the second hub configured to be in operational communication with a second half shaft; and
a locking mechanism configured to lock rotation of the clutch cam housing to the roller cage to retain the centering of each roller in the associated roller feature to prevent torque from being communicated between the clutch cam housing and the first and second hubs when the locking mechanism is activated, the locking mechanism including,
an armature plate that engages the roller cage and selectively engages the clutch cam housing,
a wave spring positioned to assert a biasing force on the armature plate to selectively engage the clutch cam housing, and
an electromagnetic coil positioned to selectively assert a force on the armature plate when activated that opposes the biasing force of the wave spring to selectively disengage the armature plate from the clutch cam housing.

12. The ORC differential of claim 11, wherein the armature plate includes armature locking tabs configured to be received within slots in a first end of the clutch cam housing to selectively lock rotation of the clutch cam housing to the roller cage.

13. The ORC differential of claim 12, further wherein:
the armature locking tabs extend radially inward from a central passage of the armature plate; and
each armature locking tab including a cage receiving notch that is configured to receive a cage tab of the roller cage.

14. The ORC differential of claim 11, further comprising:
a spring cup engaging a first side of the wave spring, the spring cup positioned to act as a bearing surface between the armature plate and the wave spring.

15. The ORC differential of claim 11, further wherein the lock further comprises:
a first end cap seated within a first end of the clutch cam housing;
a second end cap at least partially seated within a second end of the clutch cam housing, the roller cage retained between the first end cap and the second end cap; and
a bearing including an inside surface and an outside surface, the inside surface of the bearing engaging an outer bearing seating surface of the second end cap, the outside surface of the bearing engaging an inside surface of a differential housing.

16. The ORC differential of claim 11, wherein the cage centering spring is connected to the roller cage through windows in the clutch cam housing.

17. A vehicle including an overrunning clutch (ORC) differential, the vehicle including:
a motor to generate motor torque;
a transmission, the motor in operational communication with the transmission;
at least one ORC differential to selectively communicate torque between a pair of wheels and the transmission, the ORC differential including,
a pinion configured to be in operational communication with the transmission,
a ring gear operationally engaged with the pinion,
a clutch cam housing operationally engaged with the ring gear, the clutch cam housing including a central passage, an interior surface that defines the central passage of the clutch cam housing including a plurality of roller features,
a roller cage received within the central passage of the clutch cam housing,
a plurality of rollers rotationally coupled to the roller cage,
a cage centering spring engaged with roller cage and clutch cam housing, the cage centering spring configured to position the roller cage in relation to the clutch cam housing to center each of the plurality of the rollers that are rotationally coupled to the roller cage within an associated roller feature in the interior surface of the clutch cam housing,
a first hub at least in part received within a first portion of the roller cage, a portion of the first hub engaging a first set of the plurality of rollers, the first hub configured to be in operational communication with a first half shaft, a second hub at least in part received within a second portion of the roller cage, a portion of the second hub engaging a second set of the plurality of rollers, the second hub configured to be in operational communication with a second half shaft, and a locking mechanism configured to lock rotation of the clutch cam housing to the roller cage to retain the centering of each roller in the associated roller feature to prevent torque from being communicated between the clutch cam housing and the first and second hubs when the locking mechanism is activated, a memory to store operating instructions;

at least one sensor configured to generate sensor signals; and a controller in communication with the memory and the at least one sensor, the controller further configured to activate the locking mechanism based at least in part on the generated sensor signals from the at least one sensor and the operating instructions in the memory.

18. The vehicle of claim 17, wherein the locking mechanism further comprises:

an armature plate engaging the roller cage and selectively engaging the clutch cam housing;

a wave spring positioned to assert a biasing force on the armature plate to selectively engage the clutch cam housing;

an electromagnetic coil positioned to selectively assert a force on the armature plate when activated that opposes the biasing force of the wave spring to selectively disengage the armature plate from the clutch cam housing; and a spring cup engaging a first side of the wave spring, the spring cup positioned to act as a bearing surface between the armature plate and the wave spring.

19. The vehicle of claim 18, wherein the armature plate further comprises:

armature locking tabs configured to be received within slots in a first end of the clutch cam housing to selectively lock rotation of the clutch cam housing to the roller cage;

the armature locking tabs extend radially inward from a central passage of the armature plate; and each armature locking tab including a cage receiving notch that is configured to receive a cage tab of the roller cage.

20. The vehicle of claim 17, further comprising:

a first end cap seated within a first end of the clutch cam housing;

a second end cap at least partially seated within a second end of the clutch cam housing, the roller cage retained between the first end cap and the second end cap;

a bearing including an inside surface and an outside surface, the inside surface of the bearing engaging an outer bearing seating surface of the second end cap, the outside surface of the bearing engaging an inside surface of the differential housing; and a retainer ring engaging the clutch cam housing, the retainer ring further positioned to abut the first end cap to retain at least the roller cage, the plurality of rollers and the first end cap within the clutch cam housing.

* * * * *